Jan. 17, 1950 P. F. SHARP 2,495,024
APPARATUS FOR PROCESSING SUBSTANCES
CONTAINING CRYSTALLIZABLE MATERIAL
Filed Sept. 19, 1946 4 Sheets-Sheet 4
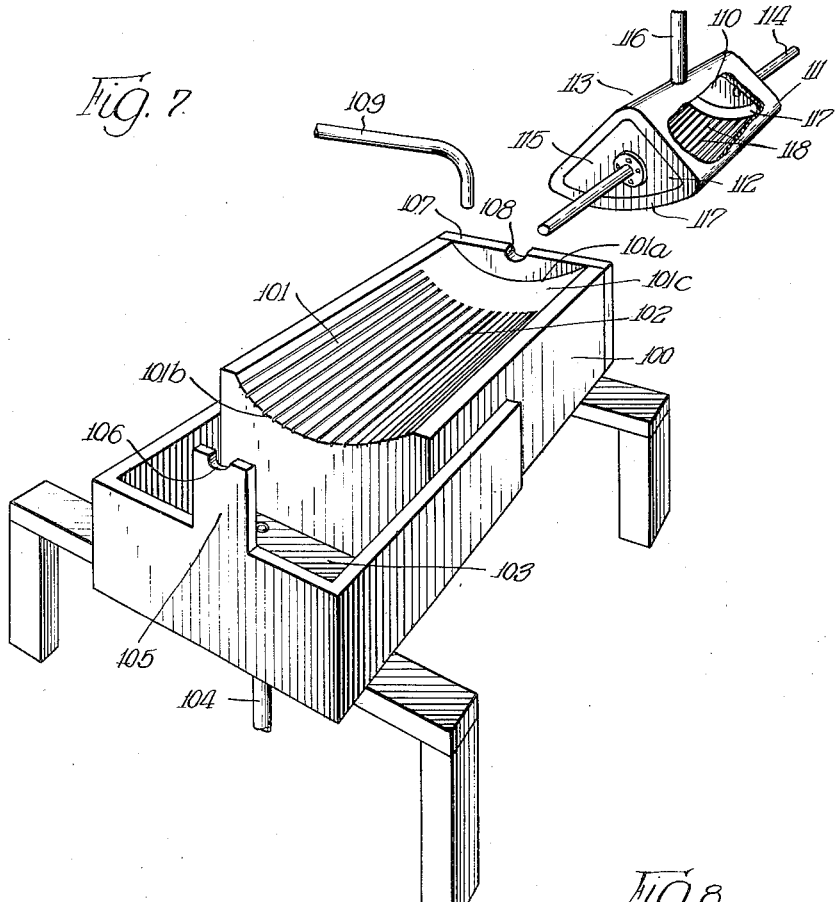
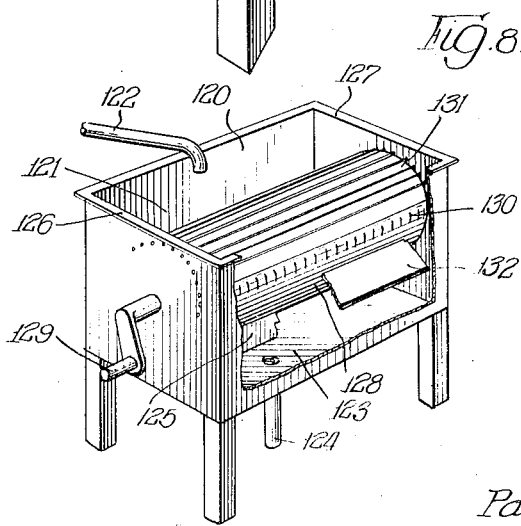
INVENTOR.
Paul F. Sharp,
BY
*Wilkinson, Huxley, Byron & Knight*
Attys Patented Jan. 17, 1950

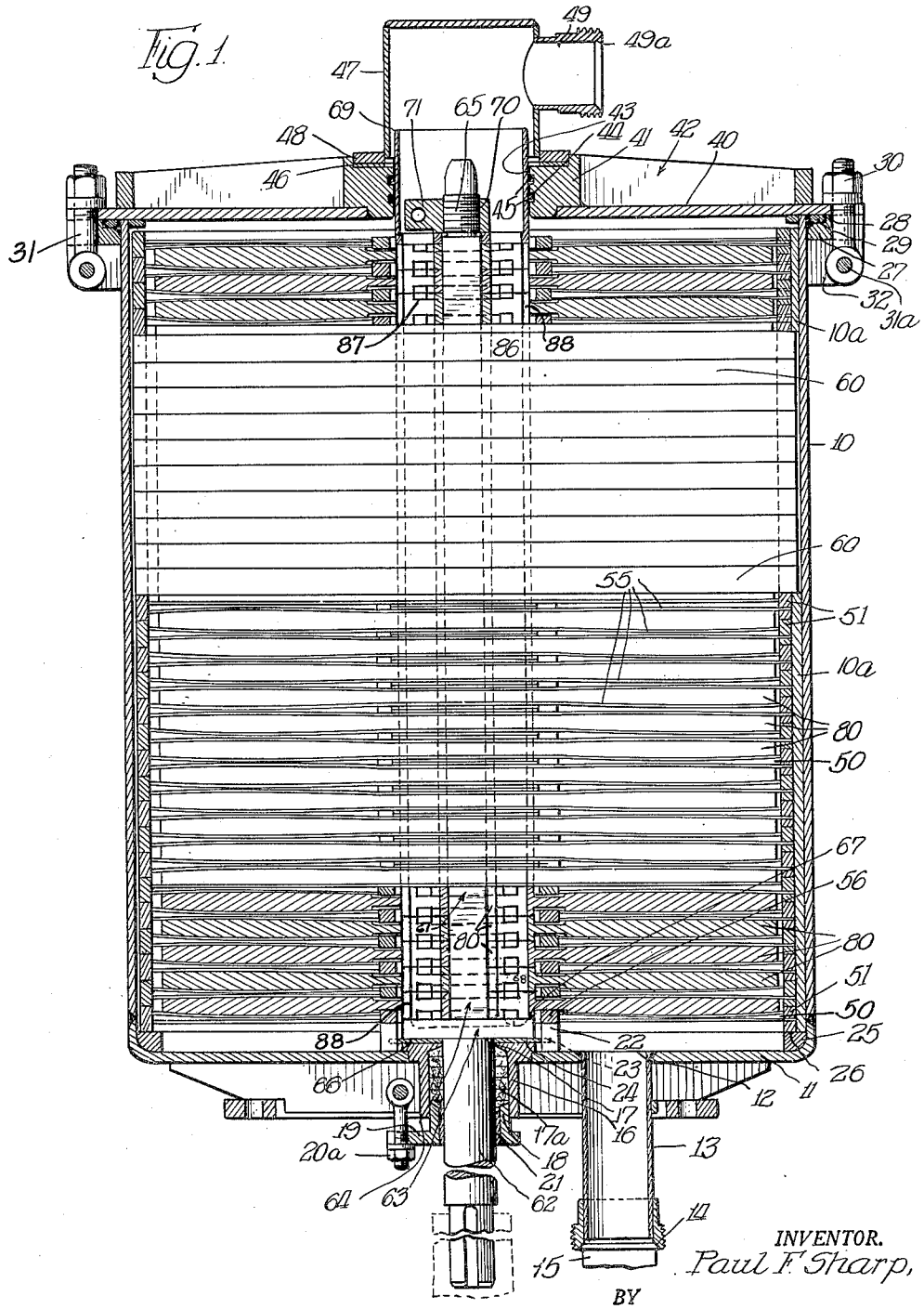

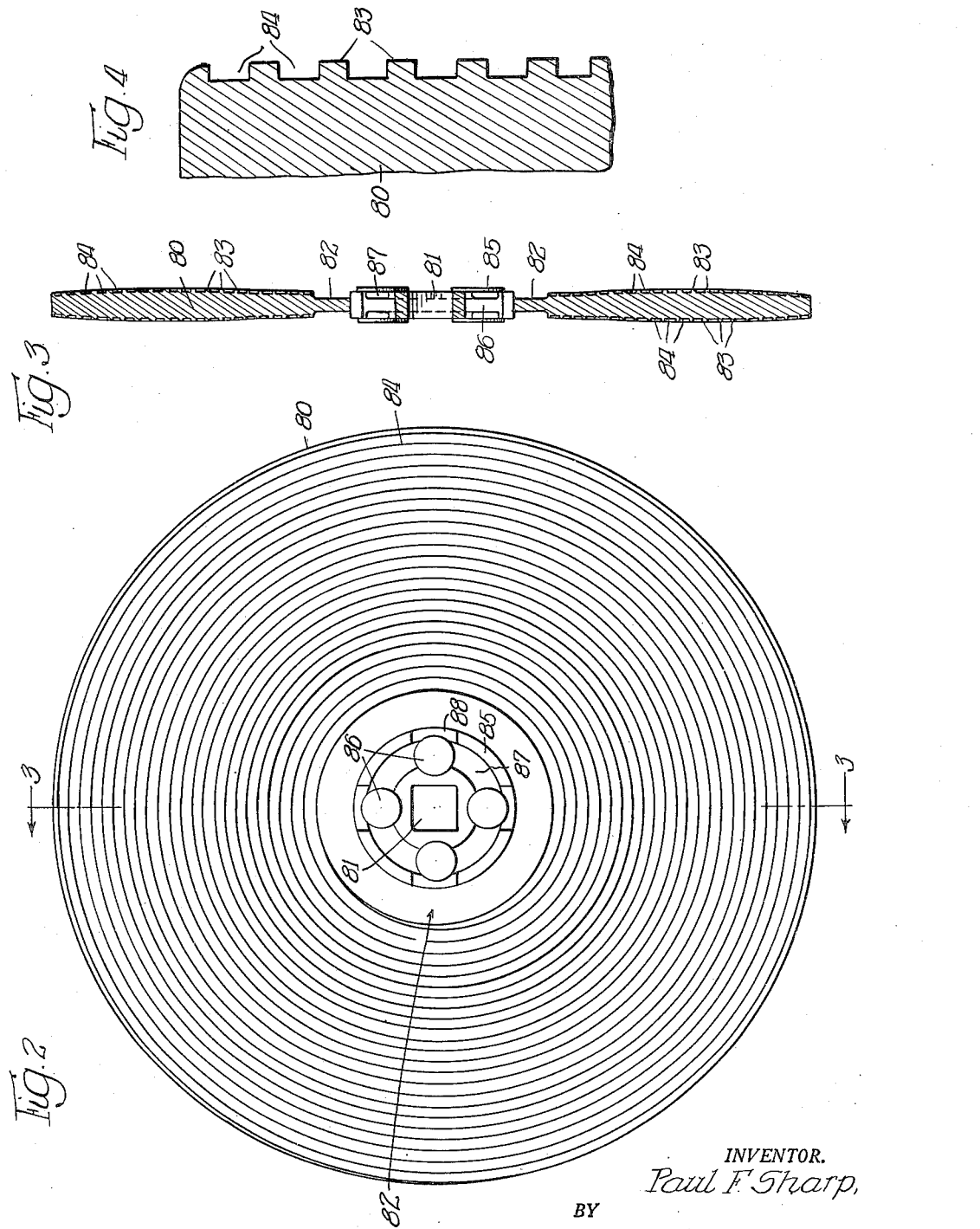

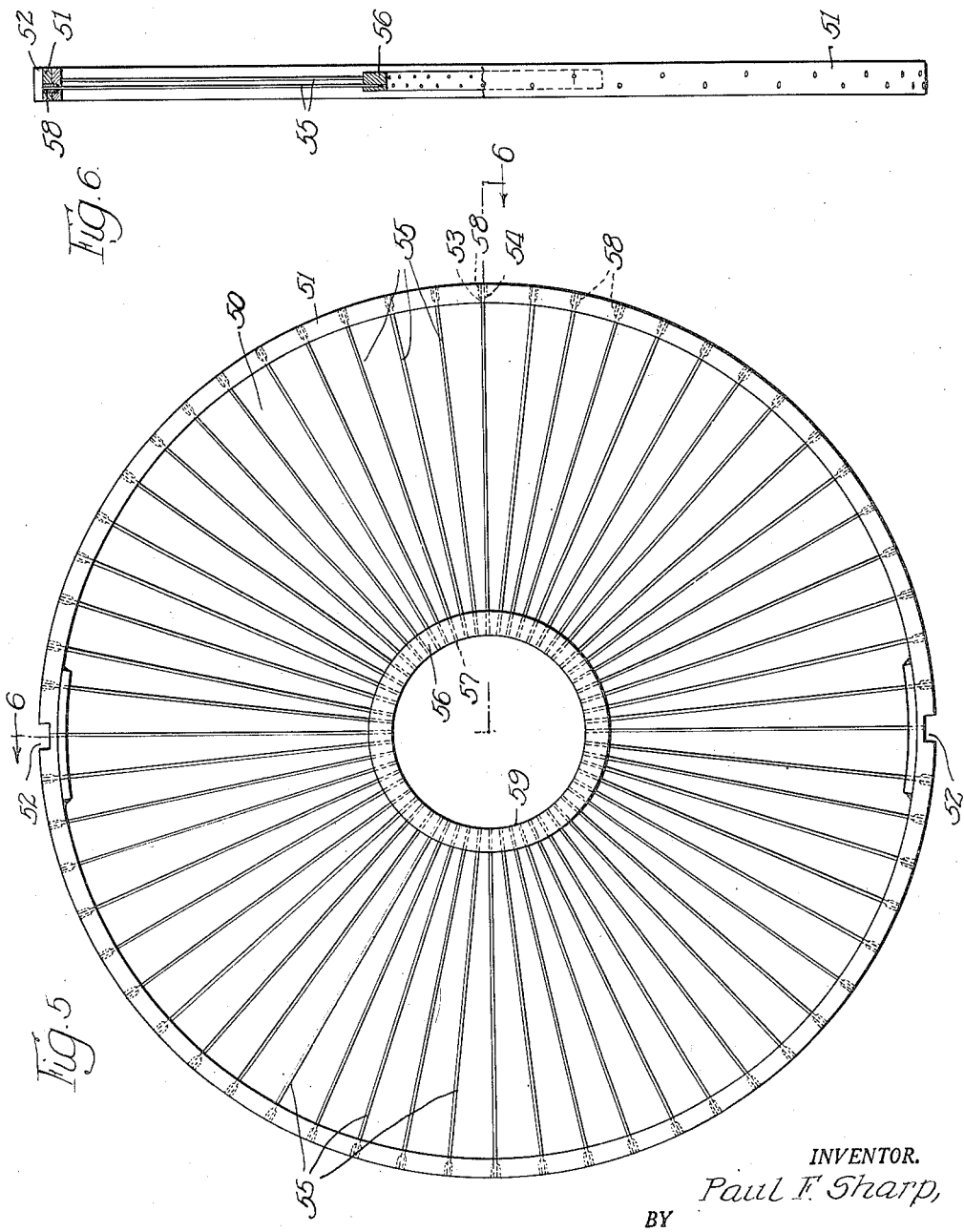

2,495,024

UNITED STATES PATENT OFFICE 2,495,024

APPARATUS FOR PROCESSING SUBSTANCES CONTAINING CRYSTALLIZABLE MATERIAL

Paul F. Sharp, Piedmont, Calif., assignor to Golden State Company, Ltd., San Francisco, Calif., a corporation of Delaware Application September 19, 1946, Serial No. 697,955

10 Claims. (Cl. 23—273)

This invention relates to new and useful apparatus for producing fine crystals in supersaturated solutions and pertains more particularly to apparatus for contacting the supersaturated solution with a seed base surface whereby crystal growth is induced.

According to one prior method, lactose crystals have been produced in sweetened condensed milk by agitating the same after seed crystals of powdered lactose have been added thereto and while such milk is supersaturated as to lactose. This method, however, is not capable of producing crystals which are sufficiently fine nor of preventing the growth of large crystals, the presence of which in food products, such as condensed milk, is highly objectionable. The use of such method has nevertheless resulted in the production of crystals which are finer than those produced by methods not employing agitation.

An additional objection to the use of methods employing powdered seed material followed by agitation is that the crystals first coming into existence are allowed time to grow to an extent which materially lessens the degree of supersaturation before other crystals come into existence.

The present invention provides an apparatus which meets and overcomes the above-stated disadvantages and constitutes seeding equipment superior to that heretofore known and used.

It is an object of this invention to provide seeding apparatus which is capable of producing a multiplicity of fine, impalpable crystals of lactose in sweetened condensed milk and similar milk products.

It is a further object of this invention to provide seeding apparatus that does not add any extraneous material to the product being treated.

It is a further object of this invention to provide a seeding apparatus which may be inclosed and from which air may be excluded, whereby oxidation of any components of the solution being treated, may be prevented.

It is a further object to provide a seeding apparatus that can seed condensed milk or any useful concentrate of milk supersaturated with lactose, such as concentrated whole milk, skim milk, whey and lactose solutions.

It is a further object of this invention to provide a seeding apparatus in the use of which the solution being treated is split into numerous small streams which are individually treated simultaneously to rapidly produce in large volume a well seeded product.

It is a further object of this invention to produce sanitary seeding apparatus, capable of easy disassembly and rapid cleansing.

Other objects and advantages not specifically enumerated will be apparent to one skilled in this art as the following description proceeds. In the accompanying drawings there is set forth, by way of illustration, certain preferred embodiments of this invention.

In the drawings—

Figure 1 is a vertical cross sectional view of one embodiment of this invention showing an assembled seeding machine which has a plurality of seed crystal-bearing discs mounted for movement with respect to suitable scraping devices.

Figure 2 is a plan view of one of the seed crystal-bearing discs employed in the device illustrated in Figure 1.

Figure 3 is a cross-sectional view of the disc shown in Figure 2, taken on the line 3—3 of Figure 2 and looking in the direction of the arrows.

Figure 4 is an enlarged fragmentary, cross-sectional view of the seed crystal-bearing surface of the disc.

Figure 5 is a plan view of the scraping element illustrated in the device of Figure 1.

Figure 6 is a cross-sectional view of the scraper element taken on the line 6—6 of Figure 5 and looking in the direction of the arrows.

Figure 7 is a perspective view of a modified form of the present invention which has a base and a swinging scraper.

Figure 8 is a perspective view of a further modified form of this invention and illustrates a device having a rotating roll and suitable scraping mechanism.

Briefly stated the present invention comprises a base element, such as a plate, cylinder, or the like, which acts as a carrier for embedded seed crystal material presented as a part of the surface of the base element, and a scraping and rippling element positioned so as to sweep the entire seed crystal surface free of the crystals which have been formed through contact with the crystal surface and the supersaturated liquid associated therewith. The sweeping action may be caused by a relative movement between the base element and the scraping and rippling element, such action being preferably controlled so as to give the solution a predetermined period of contact with the seed crystal surface.

In practicing this invention advantage is taken of the discovery constituting the invention set forth in applicant's co-pending application Serial No. 686,155, filed July 25, 1946, and entitled "Method of crystallizing crystallizable substances." From a study of that application it will be noted that the process therein disclosed involves the steps of bringing a supersaturated solution of the crystallizable material into contact with a preformed crystal bed and causing crystals to form and grow on said bed while at the same time repeatedly and promptly removing such crystals from said bed substantially as rapidly as they are formed. This process is productive of a large number of very small crystals and results in a crystallizing action which substantially eliminates the supersaturated condition of the solution without, however, producing crystals which are palpable in character.

The apparatus of the invention is especially adapted to carry out the process of said above-identified invention, and comprises as essential elements a crystal bed member and a scraping and rippling member.

The crystal bed member may be of any suitable construction provided, however, that it presents a bed surface in which may be embedded or otherwise held a quantity of crystal material of a type appropriate to the action to be performed. This member may be cylindrical, flat, or of any other suitable shape and the crystal holding means may be in the form of grooves, holes, or other indentures or irregularities formed in the surface thereof.

The scraping and rippling member may comprise any suitable mechanical means, such as a blade or wire which can be passed over the crystal bed surface so as to cause the formed crystals to be dislodged therefrom and picked up and carried in the layer of surrounding material and to be tumbled, rolled and otherwise moved therethrough in a manner to act as seed material in the further crystallization to be carried out in the solution.

The tumbling or rolling action referred to is that which results from the scraping device plowing through the layer of material on the bed and causing at least a portion of the material to pass over the top of the device. This action is similar to the rippling action of a fluid passing in a thin layer over an edge or bar. Hence the term "rippling" has been employed in designating the type of member preferred for this invention.

The two members, that is to say, the crystal bed member and the scraping and rippling member, are to be so mounted that one member has relative movement with respect to the other. This invention contemplates that such movement can be accomplished by any desirable mechanical arrangement including installations in which the bed may move while the scraping and rippling device is held stationary, installations in which the scraping and rippling device only is moved, and installations in which the necessary relative movement is supplied by some movement of both members.

It is to be understood, therefore, that the apparatus can take many different forms and may in certain instances have a housing, while in other instances a more or less open device may be preferred. Furthermore, when wires or the like are used for the scraping and rippling device, any number thereof may be employed without departing from the teachings of this invention.

In order better to understand the actual construction that may be successfully employed in practicing this invention, reference will now be made to certain specific examples which are here illustrated and described in detail. The invention is not to be limited by these illustrative disclosures, as the devices may have many different forms as hereinabove indicated and still embody, as essential element, a crystal bed member and a cooperating scraping and rippling member, as herein taught.

For a detailed showing of one embodiment of this invention, reference will now be made to Figures 1 to 6, inclusive, of the drawings which illustrate a seeding device which comprises a cylindrical housing 10 closed at the top by a cover 40 and preferably has its longest axis disposed vertically. The housing 10 may be formed with an integral bottom section 11 provided with a flow opening 12 and inlet conduit 13 preferably equipped with a sanitary beveled fitting 14. A flow line 15, through which the desired solutions may be introduced, is adapted to be received in the fitting 14. Section 11 of housing 10 is formed with a cylindrical central portion 16 extending downwardly and forming a packing casing disposed coaxially with the vertical central axis of the housing 10. Cylindrical portion 16 is provided with an axial bore 17 adapted to receive one end 62 of the shaft 61 and is preferably counterbored, as shown, to provide a suitable space in which packing rings 17a or other packing may be mounted and held by a suitable retainer ring 18.

Retainer ring 18 is preferably formed with laterally extending ears 19 by which said ring may be releasably fastened in place, by swing bolts 20 or other means pivotally attached as at 20a to ribs or brackets on the bottom section 11 of said housing 10. The retainer 18 preferably carries a suitable bearing ring 21 having an inside diameter suitable to accommodate the shaft 61.

The housing 10 is provided internally with a rib 10a which prevents rotation of the scraping and rippling member 50.

Mounted inside of the housing 10, at the lower central portion thereof, is a supporting means 22 preferably consisting of four pins spaced 90 degrees apart and rigidly mounted in the bottom section 11 of housing 10. Each pin is preferably provided with a horizontal slot 23, cut therein as shown, which with the other slots accommodates the edge portions of a washer 24.

Supported on cylindrical portion 16 is a thrust washer 24 of a diameter greater than the portion 16 and having its peripheral section freely rotatable in said slots 23. Washer 24 has an axial bore of a diameter which will accommodate the section 62 of the shaft 61.

A supporting ring 25 is preferably mounted at the bottom of the housing 10 and is formed with an upper horizontal face 26.

The housing 10 is formed with an external flange 27 surrounding the top section thereof, which forms a seat 28 for cover plate 40 and a suitable sealing means such as an annular gasket 29 provided between housing 10 and cover 40.

The cover 40 preferably is held on housing 10 by suitable releasable fastening means such as swing bolts 31 and nuts 30, the former of which are pivotally attached at their bases to lugs 32 by means of pins 31a. The cover 40 is formed with a central hub member 41 and preferably with integral reinforcing ribs 42.

Hub member 41 is provided with a central bearing opening 43 which is provided with annular grooves 44 adapted to carry suitable annular sealing means 45 such as washers, or the like. The upper extremity of the hub member 41 is, preferably, counterbored at 46 to accommodate a liquid collecting manifold 47 which is seated on the horizontal upper face provided by the counterbore. A ring 48 is provided in the counterbore for holding the manifold 47 by means of a leakproof or press fit with hub member 41 and the manifold. Manifold 47 communicates with an outlet flow conduit 49 which is preferably equipped with a sanitary beveled coupling 49a adapted to receive a suitable flow line (not shown).

Inside of the housing 10 there is mounted a series of vertically spaced scraping and rippling elements 50. Referring to Figures 5 and 6 of the drawings, it will be seen that each element 50 comprises two concentric rings 56 and 51 and a plurality of radial connecting elements 55. The rings 56 and 51 of the lowermost element 50 in the bottom of housing 10, rest on the pins 22 and the upper surface 26 of the support ring 25, respectively. The outer rings 51 have an inner diameter slightly greater than that of the seed crystal-bearing elements 80 of the rotating unit 60, and an outer diameter substantially equal to the inner diameter of housing 10. Said outer rings 51 have a height equal to the height of the hubs of the seed carrier element 80. The outer circumferential faces of said rings 51 are provided with at least one peripheral keyway 52 which slidably fits the internal rib 10a in the housing 10. At spaced circumferential locations in the rings 51 and 56 are aligned radial holes as shown at 53 and 57, respectively, adapted to receive the connecting elements 55. The holes 53 and 57 are provided in the periphery of the rings 51 and 56, respectively, in two coaxial groups which are disposed on opposite sides of the horizontal central plane of the element 50 with alternate holes staggered, as illustrated in Figure 6.

The holes 53 in the ring 51 are counterbored at 54 to accommodate suitable tensioning and holding means 58 for the connecting elements 55. The holding means 58 may be solder, screw caps, or other suitable means.

Connecting elements 55 are preferably small round wires or rods terminating at one end in a head 59 or the like. Elements 55 extend between the corresponding pairs of bores in said rings 51 and 56, respectively, and are preferably placed under approximately fifteen pounds tension when fixed in position.

The rotatable seed carrier unit 60 comprises a shaft 61 preferably composed of four sections 62, 63, 64, and 65. In the illustrated form of the invention the section 62 is arranged to fit in the bearing 17 in the cylindrical portion 16 of the housing 10. Packing 17a forms a seal for the bearing.

Section 63 is an enlarged flange portion preferably formed integrally with the shaft 61 and having its lower surface 66 in supporting bearing contact with thrust washer 24. The upper surface 67 of flange 63 is formed with an annular channel 68 of semi-circular cross section.

Section 64 of shaft 61 is the main central section and is preferably square or non-round and serves as a mounting for seed carrier discs 80 which are placed thereon. The central openings in the discs 80 are also square so as to prevent relative rotation between the discs 80 and the shaft 61.

The discs 80 are employed in such number as to substantially fill housing 10. However, sufficient space is left at the top to accommodate at the upper end of the squared portion 64 of shaft 61 the tubular member or cup 69 which is also fixed to rotate with the shaft. The extreme end of the shaft 61 is preferably cylindrical as shown at 65 and is provided with threads 70 adapted to receive the nut 71 which holds the seeding discs on the shaft 61.

By referring to Figures 1, 2 and 3 of the drawing it will be noted that the illustrated embodiment of the seed carrier element comprises a circular disc 80 which has a central non-round hole 81, adapted to slidably fit section 64 of shaft 61 and an annular recess 82 on both faces adjacent the hub thereof. From their outer peripheries to their recesses 82, the discs 80 are preferably formed with slightly convex surfaces 83. These convex surfaces 83 have grooves 84 cut therein preferably in spiral form in the manner shown.

Recesses 82 in the seed carrier elements terminate in shoulders 85 and are adapted to slidably receive the hub rings 56 of the scraping and rippling unit 50. When discs 80 are mounted on the shaft 61 the shoulders 85 are adapted to contact the corresponding shoulders of the next adjacent disc. Openings 86 are provided in the shoulders 85 in such manner that when discs 80 are mounted on shaft 61 they collectively form a plurality of continuous flow passages as shown. One or more such flow passages may be used.

The surfaces of shoulders 85 are each formed with a liquid collection channel 87 of smaller diameter than openings 86 with which they communicate. Each channel 87, in conjunction with the next adjacent channel 87, forms a horizontal annular liquid collection ring, located between the opposed faces of adjacent discs.

Shoulders 85 of the discs 80 are further provided with recesses or notches 88 preferably symmetrically arranged in such manner that each communicates with its corresponding opening 86. Each recess 88 forms with the corresponding recess in the next adjacent disc a communication between the vertical passages or conduits formed by the openings 86 and the space between the convex faces of adjacent discs.

A cup-like member 69 is mounted for rotation with the shaft 61 and in open communication with the manifold 47 and preferably has four holes in its bottom adapted for alignment with the openings 86 in the topmost disc 80. Member 69 is adapted to fit the central opening 43 of the cover 40 and by contact with sealing means 45 provide a leakproof journal for the rotating unit 60.

From the foregoing description it will be seen that liquid introduced into the housing 10 through pipe 13 first flows outwardly, and thence inwardly in contact with the disc surfaces 83. The liquid next passes through the recesses 88 into channels 87 and through the openings 86. Finally, the liquid passes into the cup 69 and out through the manifold 47 and the outlet 49 to a suitable storage place.

The apparatus described above may be assembled in the following manner. Housing 10 is set in a brace or frame (not shown) and held in the desired position. The thrust washer 24 and its associated pins 22 are placed in the housing 10 and the pins 22 are pressed into recesses in the housing 10 provided therefor. Next, the supporting ring 25 is installed, and thereafter the lowermost scraping and rippling member 50 is slipped into place guided by the keyway 52 and the cooperating housing rib 10a. The first unit to be put in place rests on the pins 22 as well as the supporting ring 25.

The rotating element 60 is next introduced into the housing by first inserting the center shaft 61 from the top so that the lower end 62 thereof passes through bearing 17 and the flange 63 comes in contact with the washer 24. Next the first of discs 80 is placed on the shaft 61 and lowered until its bottom shoulder 85 comes in contact with the upper surface of the flange 63 on the shaft. At this point the liquid collection channel 87 on the bottom face of the first disc 80 coincides with the corresponding channel 68 provided in the upper face of the flange 63. In addition, the bottom convex surface of disc 80 is in contact with the upper group of wires 55 of the scraping and rippling member 50.

Next, the second scraping and rippling member 50 is lowered into the housing until the outer ring 51 thereof rests upon the corresponding ring 51 of the first scraping and rippling member placed in the housing. When the members are thus associated the inner ring 56 of the scraping and rippling member 50 occupies a part of the space provided by the recesses 82 in the adjacent discs 80.

Alternately, discs and scraping and rippling members are set in the housing until the housing 10 is filled. The cuplike member 69 is the next member mounted on the square portion 64 of the shaft 61. The discs and the cup-like member are finally locked rigidly in place by spanner nut 71.

The cover 40 is then lowered into place so that the cup-like member 69 extends through the central opening 43 thereof and communicates directly with the manifold 47. The cover is then locked in position by nuts 30 and swing bolts 31.

The bottom journal of the device is next made tight by the insertion of suitable packing 17a and by clamping the packing in place by means of a retainer ring 18 held by nuts 20a. With the unit fully assembled, the shaft is ready to be rotated by a prime mover, through suitable transmission means (not shown), such as a coupling, multispeed transmission gears, belt, or similar device which may be connected to the lower end 62 of the shaft 61. As assembled, the sum of the areas of the ports formed by recesses 88 is preferably equal to the area of the inlet feed pipe 13, thus insuring a steady continuous flow through the apparatus during operation.

Referring now to Figure 7, it will be noted that in this embodiment of the invention the apparatus comprises a base element 100. In this instance, the base is formed with a concave surface 101 preferably inclined at an angle of about 15 degrees from the liquid receiving end 101a to the discharge end 101b. The concave surface 101 has a smooth portion 101c and a portion 102 provided with seed material grooves running lengthwise over its concave surface. An end plate 107 is preferably provided to close the liquid inlet end 101a of base 100 and is equipped with a shaft bearing 108. Suitable liquid inlet means are provided, such as pipe 109 adapted to feed material to the smooth portion 101c of concave surface 101. The fluid, after being treated, issues as an overflow from the discharge end 101b of concave surface 101 and empties into a trough 103 equipped with an outlet 104. Extending vertically from the end wall of the trough 103 is a projection 105 provided at its upper end with a grooved bearing surface 106.

A scraping and rippling member 110 is provided in this case, and preferably is formed as a section of a cylinder. It comprises two sector-shaped end plates 111 and 112 and a frame 113 which separates the end plates by an amount at least equal to the length of grooves 102 in the base 100. End plates 111 and 112 are also provided with aligned shafts 114 and 115 extending in opposite directions therefrom. Projecting upwardly from said scraping and rippling member and disposed transversely to the axis of the shafts, is an arm 116 adapted to be manually operated to oscillate said scraping and rippling member 110. The arm may if desired be adapted for attachment to a suitable mechanical means for imparting oscillatory motion thereto. The arcuate edges 117 of the end plates 111 and 112 are of substantially the same curvature as the concave surface 101 and are adapted to hold on their external peripheries a series of spaced longitudinal scraping and rippling elements 118, preferably in the form of wires.

This apparatus is assembled by merely seating the shafts 114 and 115 of the scraping and rippling member 110 in bearing surfaces 106 and 108, by which arrangement the elements 118 just barely contact surface 101 of base 100. If desired, the shafts 114 and 115 may be held in the bearings by cap members (not shown) or the like, or the entire scraping and rippling member may be mounted for spring pressed engagement with the seed crystal base.

When operating this seeding device, liquid flows through pipe 109 to the smooth section 101c of the concave surface 101 and, due to gravity, flows slowly down the inclined concave surface 101 in contact with crystal seed material embedded in grooves 102. Through the reciprocating action of the elements 118 of the scraping and rippling member 110, the liquid in contact with the seed crystal surface and the crystalline material formed during such contact is scraped or dislodged from the seed crystal base. The treated liquid overflows into trough 103 and is conducted to storage through a conduit 104.

Referring now to Figure 8, it will be noted that in the embodiment of the invention there disclosed, there is a movable seed base instead of a movable scraping and rippling means. This apparatus comprises a treating chamber 120 having two walls 126 and 127, and a vertical plate 125 projecting upwardly from the bottom thereof. Chamber 120 is thus sectionalized into a liquid compartment 121 which receives the material to be treated from an inlet such as a pipe 122, and a treated liquid compartment 123 equipped with outlet means 124. Rotatably attached to the end heads 126 and 127 of the chamber 120 is a drum 128 adapted for rotation by suitable means, such, for example, as the crank 129 or suitable means adapted for attachment to an electric motor or other source of power.

Drum 128 has seed material grooves 130 preferably cut as a spiral in its convex surface. The drum 128 has in contact therewith a series of elements 131 in the form of taut wires.

The scraping and rippling elements 131 are arcuately disposed in the trough and extend between the end plates 126 and 127 so as to contact the surface of drum 128.

The liquid to be treated is introduced into the compartment 121 from the inlet pipe 122. When the drum 128 is rotated it picks up a coating of the untreated liquid on its surface. This liquid is dislodged from the surface of the seed crystal material in the grooves 130 of the drum surface by each of the wire elements 131 and thereafter is removed altogether from engagement with the drum surface by a scraping knife 132. The treated liquid collects in compartment 123 of the trough 120 and is conducted to storage through a conduit 124.

In preparing the seeding surfaces the grooves are filled with crystalline material to form a crystalline surface of such character that nucleii of like crystals will form thereon when the device is in operation. Satisfactory seed surfaces may be obtained by moistening pulverized crystals and working the mass until it is converted into a thick paste. This paste may then be applied in such manner that the spiral groove is filled and the level of the crystal material is flush with the moving disc surface. The unit is then dried.

A preferred procedure for the production of a seed layer of lactose is as follows: A hot, concentrated lactose syrup is obtained by boiling a lactose solution at a temperature of about 220° F. to 240° F. until it contains no crystals. The syrup is then poured into the grooves and the excess is wiped off substantially even with the disc surface. Upon cooling, the syrup crystallizes and hardens in the grooves. Excessive moisture present is removed by applying heat as by placing the disc in front of a heating device such as a set of electric lamps, a steam coil, or other suitable heater.

The operation of the apparatus illustrated in Figures 1 to 6, inclusive, is as follows:

Sweetened condensed milk, containing 74.5% solids of which about 8.7% may be butterfat, is first cooled to about 75° F. This may be carried out by any suitable procedure but preferably it should be effected by spraying in a vacuum chamber. Thereafter, the procedure described and claimed in copending application Serial No. 697,954, filed of even date herewith may be followed. According to that procedure, the cooled, sweetened and condensed milk when about 70° F. is pumped into the housing 10 through feed inlet 13 while the seed crystal-bearing discs 80 are rotated at approximately 5 R. P. M. The result is that the milk fills the space in the housing 10 between the discs 80 and as it passes therebetween it comes in contact with the lactose seed crystal surfaces. As the discs rotate, the material in contact with the surfaces of the disc is continuously scraped and rippled by the wires 55. Th milk flows inwardly toward the center of the device and through the ports formed by the recesses 88. The seeded milk enters the conduits 86 and flows upward to the manifold 47 and out through the outlet pipe 49.

Because of the fact that the discs 80 are of less diameter than the internal diameter of the housing 10, an annular space is provided adjacent the outer edges of the discs through which material to be treated may pass so that some material will enter simultaneously all of the spaces provided between the discs. This construction provides what may be regarded as a plurality of parallel streams of flow. Obviously, the capacity of the device can be altered by varying the number of discs included therein.

The most suitable temperature for the product being treated will vary with each process, product, and degree of supersaturation. For example, sweetened condensed milk may be treated at temperatures of between 70° F. and 100° F. The only limitation upon the temperature to be used is that it should be sufficiently low to assure that a supersaturated solution is being pumped through the apparatus.

The only limitation on the viscosity of the liquid that may be treated by the above apparatus is that the liquid must be capable of being pumped without undergoing a temperature rise such as would reduce the supersaturation to a point outside of the preferred crystallizing range. If the liquid can be satisfactorily pumped in through the inlet pipe it will flow through the described apparatus without difficulty.

The number of crystals per cubic centimeter of fluid constituting a product which has been subjected to highly efficient seeding varies with each individual product. The process requiring the most exacting treatment and the highest crystallizing efficiency in order to produce the greatest number of small crystals is that utilized in the production of sweetened condensed milk.

Crystals of more than 30 microns in length impart to sweetened condensed milk a sandy texture, and their presence is highly objectionable. Examination of samples of condensed milk obtained on the open market show crystal content varying from between forty million crystals to four hundred million crystals per cubic centimeter, and also varying in size from 5 to 50 microns. The average size generally varies inversely as the number of crystals increases. By the above described scraping method, truly impalpable crystals, averaging in size from 2 to 5 microns in length and numbering as high as two thousand million have been produced in sweetened condensed milk. Condensed milk prepared by this process, upon ageing, does not develop any crystals as large as 50 microns notwithstanding the fact that crystals of such size, while relatively few in number, are found all too frequently in commercial condensed milk now on the market.

It will be seen from the foregoing description that the seeding apparatus provided by this invention is one capable of carrying out a continuous seeding operation, and is one which is capable of accomplishing all the objects hereinabove set forth.

It will be seen that whereas the cleansing of known seeding apparatus heretofore has been difficult, the new apparatus of this invention is readily demountable and is made up of units, every one of which is separable from the other whereby the same may be quickly and easily cleansed.

Seeding devices constructed according to the present invention are particularly useful for inducing crystallization in viscous and syrupy supersaturated solutions, such as sweetened condensed milk having an excess of dissolved lactose, solutions formed by hydrolysis of startches having an excess of dissolved dextrose or maltose, solutions of high sucrose content, honey, and similar solutions.

Although the present invention has been described in connection with the illustrated forms of apparatus, it should be understood that it is not to be limited to the devices described, as the same includes all modifications and equivalents as may fall within the scope of the appended claims. For example, by varying the arrangement of the flow paths or by changing the design of the seed carrier discs of the device shown in Figures 1 to 6, inclusive, a part or all of the liquid being treated can be caused to contact the seed-crystal bearing surfaces of any desired number of discs thus permitting arrangements which will cause the liquid to contact the discs in series paths of flow or in parallel paths of flow or by a combination of both series and parallel flow paths, as may be desired.

What is claimed is:

1. Apparatus for propagating and controlling crystalline development in supersaturated solutions comprising a crystal bed member provided with a surface having alterations therein adapted to hold masses of crystalline material thereto, means for introducing amounts of supersaturated solution to said surface, means for scraping said surface and for rippling through the supersaturated solution during said scraping action, supporting means for said scraping and rippling means providing relative movement between said scraping and rippling means and the crystallizing surface of said crystal bed member, said crystallizing surface and said supporting means being so constructed and arranged as to provide a shallow layer of the supersaturated solution in non-return flow across said surface.

2. Apparatus for propagating and controlling crystalline development in supersaturated solutions a base element provided with a surface having alterations therein adapted to receive and hold a quantity of crystal material to serve as seed crystals, means for conducting said solution to the seed crystal surface in shallow non-return flow, means for conducting treated solution away from said seed crystal surface and for maintaining it separate from untreated liquid, a scraping and rippling member associated with said base element and adapted to scrape the crystal surface thereof, supporting means for said scraping and rippling member providing relative movement between said scraping and rippling member and the crystallizing surface of said base element so that said scraping and rippling member follows the contour of said crystal surface.

3. Apparatus for propagating and controlling crystalline development in supersaturated solutions comprising a base element provided with a surface having alterations therein for holding crystalline seed material on at least a portion of said surface, said base element surface forming a course for the liquid to be treated, means for introducing amounts of supersaturated solution to said surface in a shallow non-returning layer of flow, a scraping and rippling member associated with said base element mounted in contact with said surface, supporting means for said scraping and rippling member providing relative movement between said member and said surface of the base element to scrape the crystal forming surface thereon and to ripple through the shallow layer of supersaturated solution undergoing treatment.

4. Apparatus for propagating and controlling crystalline development in supersaturated solutions comprising a rotatable base element provided with a surface having alterations therein adapted to hold masses of crystalline material thereto, means for rotating said base element, means for introducing amounts of supersaturated solution to said surface, means for scraping said surface and for rippling through the supersaturated solution during said scraping action incident to the rotation thereof, said base element and said scraping and rippling means being so constructed and arranged as to provide a shallow layer of the supersaturated solution in non-return flow across said surface.

5. Apparatus for propagating and controlling crystalline development in supersaturated solutions comprising in combination, with a source of supply of said solution, a treating zone across which the solution is adapted to flow in non-recyclic course; a seed crystal retaining member presenting a crystal propagating surface having alterations therein for the retention of seed crystal material as part of the treating zone; a scraping and rippling element extending to sweep said crystal propagating surface; means for conducting a shallow layer of supersaturated solution across said surface in a unidirectional flow from the source of supply toward the discharge end of the zone, and supporting means for said scraping and rippling element providing relative movement between the scraping and rippling element and said crystal propagating surface.

6. Apparatus for propagating and controlling crystalline development in supersaturated solutions comprising, in combination with a source of supply of said solution, a seed crystal retaining member having a surface with alterations therein for the retention of seed crystal material, a feed system for introducing amounts of supersaturated solution to said member, a scraping and rippling element for sweeping the seed crystal surface of said retaining member, means providing relative movement between said scraping and rippling element and said seed crystal member, said element and member cooperating to provide a shallow layer of the supersaturated solution in non-return flow across said crystal surface of the retaining member.

7. Apparatus for propagating and controlling crystalline development in supersaturated solutions comprising a plurality of crystal bed members provided with surfaces having alternations therein adapted to hold masses of crystalline material to form at least a portion of said surfaces, said members being juxtaposed so as to provide a relatively narrow space therebetween for the flow of solution extending over said surfaces, a plurality of narrow elements extending over said surfaces and between said surface members to sweep over and scrape the latter, supporting means for said elements, means providing relative movement between said elements with said supporting means and said members, said crystallizing surfaces of said members and said supporting means therefor being so constructed and arranged as to provide shallow layers of the supersaturated solution in non-return flow across said surfaces.

8. An apparatus for inducing crystallization of a crystallizable component from supersaturated solutions comprising a housing, means for introducing these solutions into said housing, a rotatable shaft disposed in said housing and mounted for rotation therein, a series of crystal bed members provided with surfaces having alterations therein adapted to hold masses of crystalline material, said members having at least a part of their surfaces slightly convexed so as to present crystalline material as at least a part of said convex surfaces, said members having aligned passages therethrough providing conduits, and means for scraping said surfaces and rippling through said supersaturated solution during said scraping action, supporting means for said scraping and rippling means holding said latter means relative to said crystal bed members so as to provide shallow layers of supersaturated solution in non-return flow across the surfaces of said members.

9. An apparatus for inducing crystallization of a multiplicity of small crystals of a crystallizable component from a supersaturated solution thereof comprising a housing, fluid inlet means into said housing, a rotatable shaft arranged in said housing and having one end journaled in said housing, said shaft being attached to a prime mover for rotating the shaft, a series of discs mounted on said shaft of greatest width at the hub having the upper and lower faces slightly convexed between the periphery and hub and having spirally arranged grooves in said faces adapted to hold crystallization-initiating material, aligned bores in said hubs forming fluid outlet means, a series of interceptor means composed of two concentric rings joined by metal wires of a length slightly greater than the crystallization-initiating surface positioned between each consecutive pair of discs and having the wires riding in contact with said convex surface, and a manifold carried by said housing and communicating with said outlet means.

10. An apparatus for inducing crystallization of lactose from sweetened condensed milk, comprising a housing, means for introducing the sweetened milk into said housing, a rotatable shaft arranged in said housing and having one end journaled in said housing, said shaft being attached to a prime mover for rotating the shaft, a series of discs mounted on said shaft having upper and lower slightly convex faces and spirally arranged grooves in said faces adapted to hold seed crystal material, said discs having aligned bores forming liquid conduits, a series of scraping and rippling elements composed of two concentric rings joined by metal wires mounted within the housing, said wires being in contact with the crystal bearing surfaces of said discs, and a manifold carried by said housing and communicating with said discharge means.

PAUL F. SHARP.

REFERENCES CITED

The following references are of record in the file of this patent:

UNITED STATES PATENTS

| Number | Name | Date |
|---|---|---|
| 1,430,900 | Haferkamp | Oct. 3, 1922 |
| 1,810,217 | Lohmann | June 16, 1931 |